United States Patent
Sakurai et al.

(10) Patent No.: US 8,243,609 B2
(45) Date of Patent: Aug. 14, 2012

(54) METHOD AND APPARATUS FOR MONITORING A STATUS OF NODES OF A COMMUNICATION NETWORK

(75) Inventors: Kohei Sakurai, Munich (DE); Marco Serafini, Darmstadt (DE); Neeraj Suri, Hannover (DE)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/466,088

(22) Filed: May 14, 2009

(65) Prior Publication Data

US 2009/0285107 A1  Nov. 19, 2009

(30) Foreign Application Priority Data

May 16, 2008  (EP) ..................................... 08009078

(51) Int. Cl.
*H04L 1/00* (2006.01)

(52) U.S. Cl. ...................................................... 370/242

(58) Field of Classification Search .................. 370/254, 370/450, 389; 709/224, 250
See application file for complete search history.

(56) References Cited

U.S. PATENT DOCUMENTS

| | | | |
|---|---|---|---|
| 7,184,421 B1 * | 2/2007 | Liu et al. | 370/338 |
| 7,457,236 B2 * | 11/2008 | Cheng et al. | 370/220 |
| 2009/0328189 A1 * | 12/2009 | Budyta et al. | 726/14 |

FOREIGN PATENT DOCUMENTS

EP   1 769 993 A2   4/2007

* cited by examiner

*Primary Examiner* — Chandrahas Patel
(74) *Attorney, Agent, or Firm* — Cowell & Moring LLP

(57) ABSTRACT

A method and apparatus for monitoring the operability status of nodes of a communication network determines first node status data at a first node by causing it to diagnose its own status and the status of at least one second node, and to send the first node status data to at least one second node. The first node receives second node status data from at least one second node, and determines node status evaluation data at the first node based on the determined first node status data and the received second node status data.

8 Claims, 14 Drawing Sheets

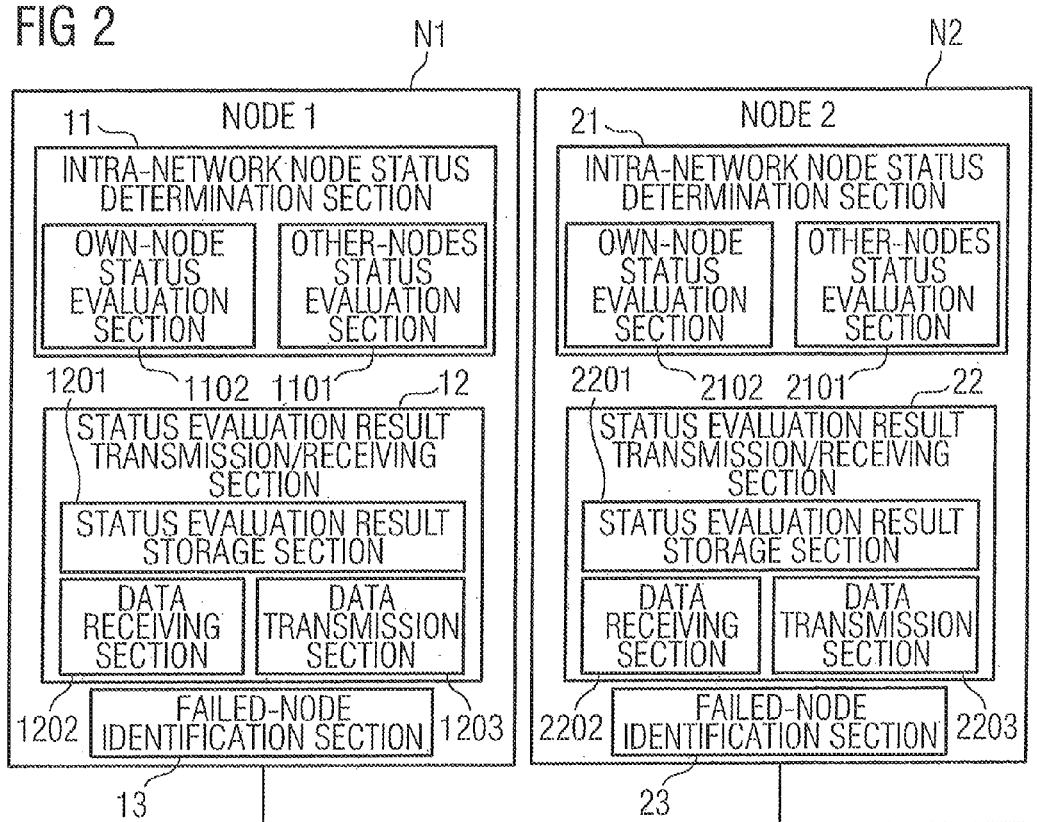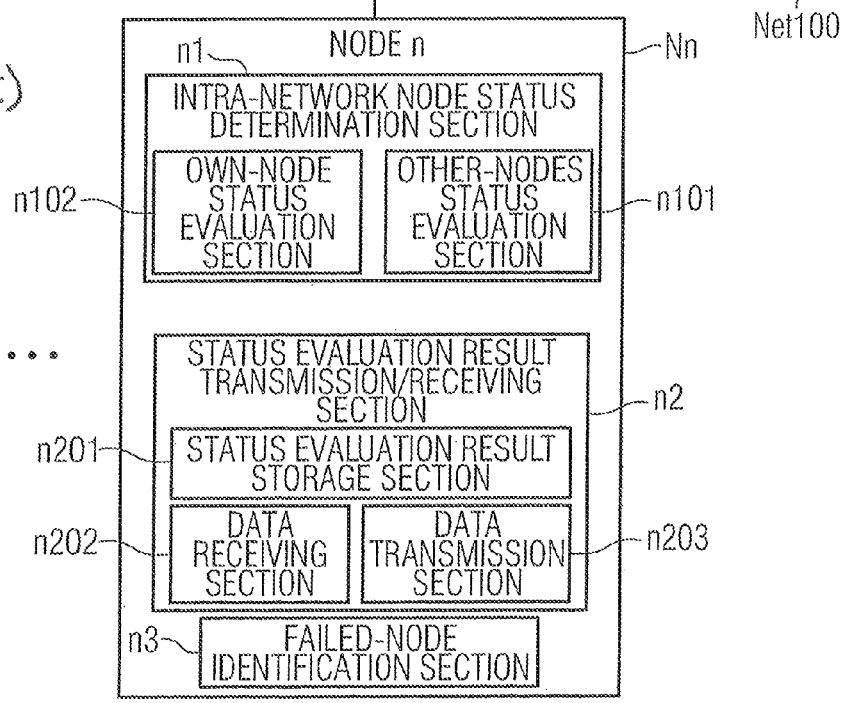

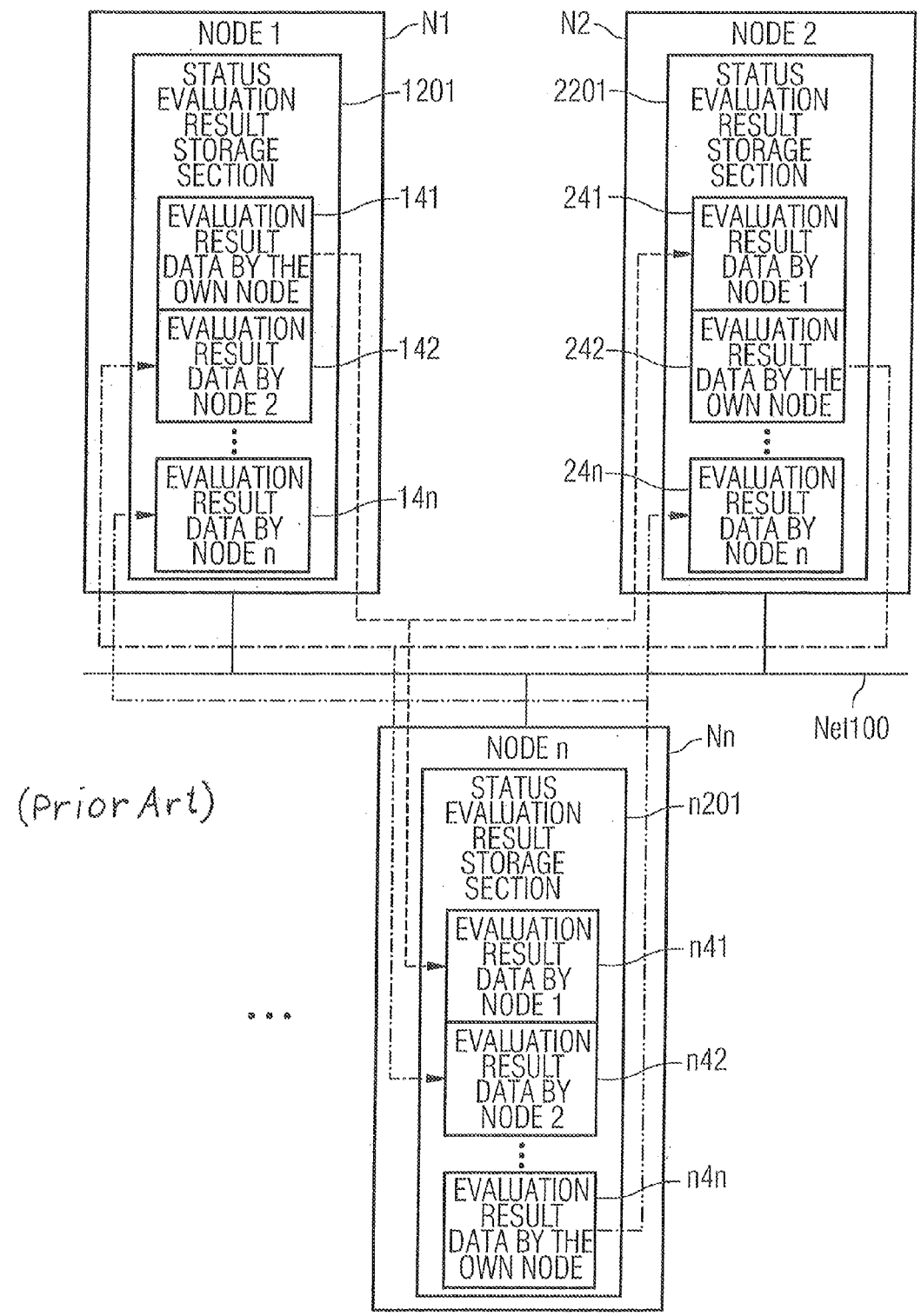

FIG 11

| NODE STATUS DATA FIELD 1110 | | | | FAILURE NOTIFICATION SYNCHRONIZATION FLAG FIELD 1120 | | | | FAILURE COUNTER VALUE FIELD 1130 |
|---|---|---|---|---|---|---|---|---|
| NODE A1 (OWN-NODE) STATUS | NODE A2 STATUS | NODE A3 STATUS | NODE A4 STATUS | NODE-A1 FAULTY OR NOT | NODE-A2 FAULTY OR NOT | NODE-A3 FAULTY OR NOT | NODE-A4 FAULTY OR NOT | |

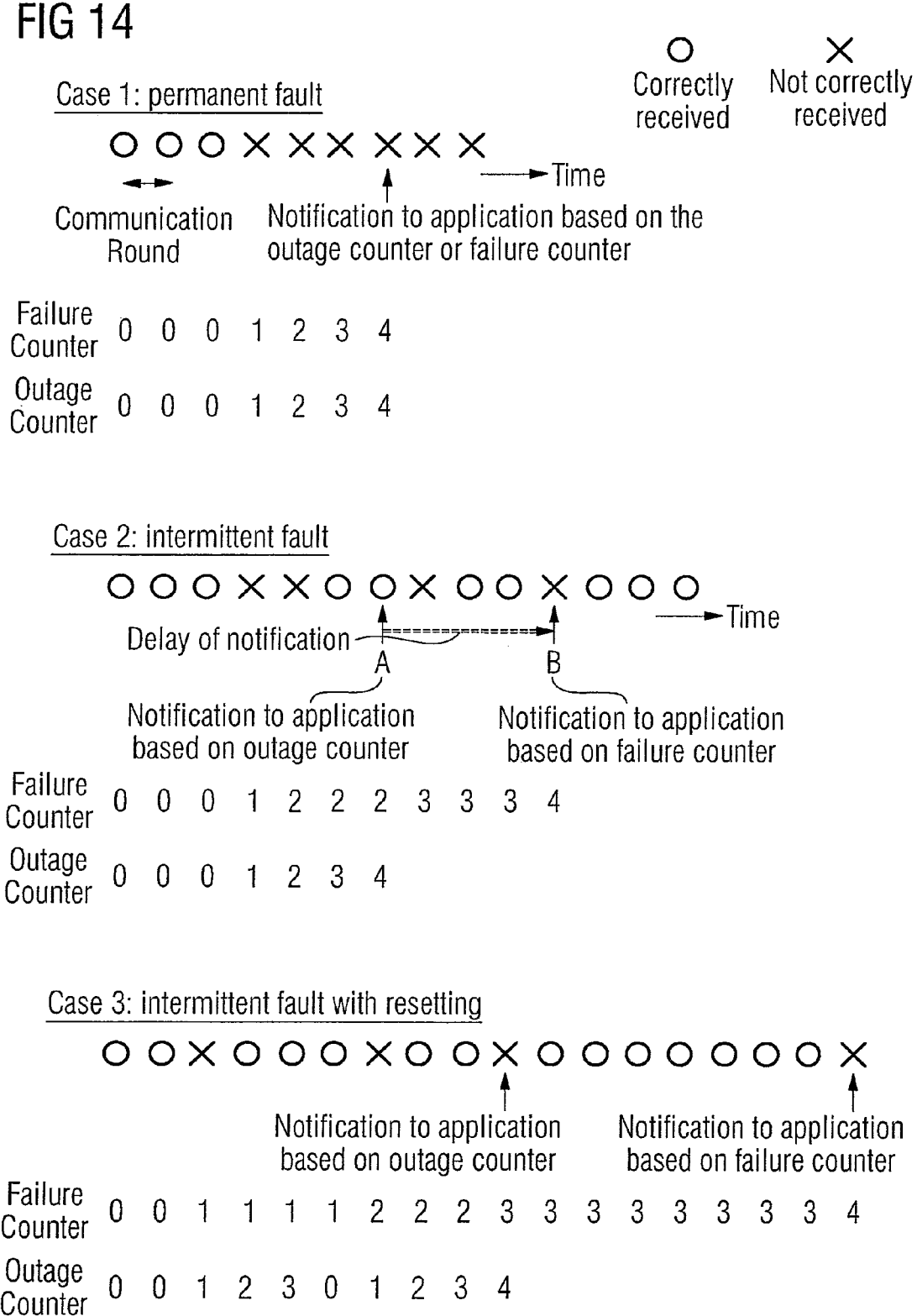

METHOD AND APPARATUS FOR MONITORING A STATUS OF NODES OF A COMMUNICATION NETWORK

The present invention relates to a method and apparatus for monitoring a status of nodes of a communication network.

Such a method and apparatus are known, for example, from EP 1 769 993 A2, which is herewith incorporated by reference. The present invention is based on this prior art document and provides improvements.

EP 1 769 993 A2 describes a highly dependable communication network used by a vehicle control system, for which an example is given in FIG. 1 hereof. The vehicle control system shown in FIG. 1 is equipped with an integrated vehicle motion control ECU 110 which centrally controls the vehicle motion based on signals from a steering angle sensor Sen1 which measures a rotation angle of a steering wheel 141, brake pedal position sensor Sen2 which measures a depression of a brake pedal 152, accelerator pedal position sensor Sen3 which measures a depression of an accelerator pedal, and sensors (e.g., an acceleration sensor, yaw rate sensor, and wheel speed sensor: not shown) which detect vehicle conditions by interpreting an intention of the driver using signals from the sensors which detect driver's requests. These components constitute nodes, being connected to the main network Net100A. In the sense of the present patent application, node means (but is not limited to) any entity that is connected to a network and is able to send and/or receive data.

An SBW (Steer-by-Wire) VGR (Variable Gear Ratio) driver ECU 111 which controls a steering motor M1 and a motor M5, an SBW driver ECU 112 which control a steering motor M2, BBW (Brake-by-Wire) driver ECUs 113A to 113D which control brake motors M3A to M3D, an integrated DBW (Driver-by-Wire) control ECU 120 which centrally controls a drive system of the vehicle, EAS (Electronic Active Suspension) Driver ECUs 114A to 114D which control suspension motors M4A to M4D are connected as actuator driving nodes to the main network Net100A, where the steering motor M1 generates a front-wheel steering force, the motor M5 acts on a variable gear ratio (VGR) mechanism mounted on a steering column, the steering motor M2 generates a rear-wheel steering force, the brake motors M3A to M3D generate braking forces for the four wheels, and the suspension motors M4A to M4D adjust damping forces.

Furthermore, the main network Net100A is connected with a millimeter wave radar/camera Sen4 which detects conditions outside the vehicle and an airbag ECU 115 which controls airbag deployment. The backup network Net100B is connected with minimum nodes required for safe running of the vehicle: namely, the steering angle sensor Sen1, brake pedal position sensor Sen2, SBW VGR driver ECU 111, and BBW driver ECUs 113A to 113D.

The integrated DBW control ECU 120 is connected with an engine control ECU 121, transmission control ECU 122, motor control ECU 123, and battery control ECU 124 via a network Net101. The integrated vehicle motion control ECU 110 is connected with an information gateway 130 and body system gateway 140 via a network Net102 and exchanges data with these devices, where the information gateway 130 provides a gateway into a network which controls car navigation and other information devices and the body system gateway 140 provides a gateway into a network which controls body-related devices such as door locks, side mirrors, and, various meters. Although not shown, the airbag ECU 115 is connected at another end with a safety-related network which integrates various sensors and actuators needed for airbag deployment control.

According to this example, the integrated vehicle motion control ECU 110 calculates the steering angle, braking forces, driving force, and the like for vehicle travel control based on signals from a steering angle sensor Sen1, brake pedal position sensor Sen2, accelerator pedal position sensor Sen3, and sensors (e.g., an acceleration sensor, yaw rate sensor, and wheel speed sensor: not shown) which detect vehicle conditions. Then, it gives steering angle commands to a front-wheel SBW VGR driver EUC 111 and rear-wheel SBW driver ECU 112, braking force commands to the BBW driver ECUs 113A to 113D of the four wheels, and a driving force command to the integrated DBW control ECU 120. Upon receiving the driving force command, the integrated DBW control ECU 120 calculates driving forces which power sources such as an engine and motors should generate, taking energy efficiency into consideration and transmits resulting driving force commands to the engine control ECU 121, motor control ECU 123 and the like via a network. By using not only the information from the sensors which detect driver's requests, but also information from the radar/camera Sen4 which detects the conditions outside the vehicle, the integrated vehicle motion control ECU 110 can perform control such as trail driving, lane-keeping driving, and risk-averse driving.

In such a safety critical vehicle control system, in case a certain node of the communication network fails, the remaining nodes have to execute a backup control using the information which node has failed. Therefore, it is essential to identify failed nodes accurately and to ensure consistency of information as to which node has failed among all remaining nodes by communicating through the network. As a consequence, a node status monitoring functionality is needed.

In the following, the approach taken by EP 1 769 993 A2 will be described with reference to FIGS. 2 and 3. The vehicle control system shown in FIG. 2 consists of multiple nodes—namely, node 1 (N1), node 2 (N2), . . . , node n (Nn)—which are connected via a network Net100. The nodes are processing units connected to a network and capable of communicating information via the network. Specifically, they include various electronic control units, actuator drivers, and sensors mounted on a vehicle. The network Net100 is a communication network capable of multiplex communication as well as broadcasting which involves transmitting the same content simultaneously from a node to all the other nodes connected to the network.

Each node, N1, N2, . . . , or Nn (hereinafter referred to as Nx) has a node status determination section x1 (11, 21, . . . , or n1), status evaluation result transmitting/receiving section x2 (12, 22, . . . , or n2), and failed-node identification section x3 (13, 23, . . . , or n3), where character x is a node number (1, 2, . . . , n) and the same applies hereinafter.

The node status determination section x1 (11, 21, . . . , n1) has an own-node status evaluation section x102 (1102, 2102, . . . , n102) which determines the status of the given node itself and other-node status evaluation section x101 (1101, 2101, . . . , n101) which determines the status of the other nodes in the same network. The "own-node status" is a self-diagnostic result of the own node while the "other-node status" is status regarding whether or not data sent from each of the other nodes is correct as viewed by the judging node. For example, in order for node 1 to determine that the "other-node status" of node 2 is normal, hardware of node 2 must operate normally, arithmetic processing in node 2 must be performed normally, and communication from node 2 to node 1 must be conducted without error. It is conceivable, for example, to use a configuration in which all nodes broadcast serial number data which is incremented in each communication cycle. In that case, if the serial number data received from a node is not incremented, it can be determined that the "other-node status" of the node is abnormal.

The status evaluation result transmitting/receiving section x2 (12, 22, ..., n2) has a data transmission section x203 (1203, 2203, ..., n203) which transmits the node status (node status determined by the own node) determined by the node status evaluation section x1 (11, 21, ..., n1) to the other nodes, reception processor x202 (1202, 2202, ..., n202) which receives node status as determined by the other nodes, and status evaluation result storage section x201 (1201, 2201, ..., n201) which stores the node evaluation result made by the own node and node evaluation result made by the other nodes.

The failed-node identification section x3 (13, 23, ..., or n3) identifies a failed node based on the node evaluation result made by the own node as well as on the node evaluation result made by the other nodes and received by the status evaluation result transmitting/receiving section x2.

As shown in FIG. 3, every node connected to the network Net100 has a status evaluation result storage x201 (1201, 2201, ..., n201), which contains both evaluation result data of the own node and of the other nodes. For example, node 1's result of the status evaluation with respect to the other nodes, which is stored in a buffer 141 in the status evaluation result storage section 1201 of node 1, is transmitted to all the other nodes via the network Net100 and is stored in the buffers x41 (241, 341, ..., n41) in the status evaluation result storage sections x201. The same applies to the transmission and reception of the status evaluation results conducted by nodes 2 to n.

Each node finally determines the status of other nodes by voting on the evaluation result data. For example, even if node 1 determines that node 2 is faulty, if the other nodes (nodes 2 to n) determine that node 2 is normal, each node can correctly determine that node 1 rather than node 2 is faulty.

One problem of this approach is that the execution time of the voting process increases in proportion to the square of the number of nodes because the status evaluation result storage section x201 contains n×n bits for an n-node system in case each evaluation result consists of n-bits as shown in FIG. 4. Moreover, the required communication bandwidth for every evaluation result is proportional to the number of nodes.

When the nodes of the network detect that a certain node is faulty, the question arises when an application using the network should be notified of the failure. In the case that the notification is executed quickly, it may happen that the application is informed about transient failures that vanish after a very short period of time. However, if the failure is communicated to the application too late, dangerous situations may occur, especially when safety critical components like the brake are faulty. Therefore, it is necessary to find a balance between a quick notification of the application and the requirement that only relevant failures are reported to the application.

Therefore, EP 1 769 993 A2 uses a failure counter, which is incremented in each communication cycle in which a node is faulty, and a failure counter threshold. When the failure counter threshold is exceeded by the failure counter, the application is notified of the failure.

Furthermore, as every node performs the evaluation whether a node is faulty or not on its own, it may happen that the nodes notify the application at different points in time, which is clearly undesirable. Therefore, a synchronisation between the nodes is needed.

FIG. 5 shows an example to illustrate how EP 1 769 993 A2 handles this problem. In an early communication cycle it has been determined that node 3 is faulty. In the communication cycle i the failure counters of node 1 and 4 are incremented to 8. Due to an error, node 2 is behind and has a failure counter with the value 5. In each communication cycle node status data and failure notification synchronisation flags are sent among the nodes (transmit frame). In the communication cycle i+1 the failure counters are incremented again. In the communication cycle i+2 the failure counters of node 1 and 4 reach the failure counter threshold of 10. In this situation, in the frames transmitted from node 1 and node 4 to node 2 the failure notification synchronisation flag for node 3 is set. When node 2 receives the frame, it adjusts its own failure counter to 10 and also notifies the application of the failure of node 3 like node 1 and 4.

This approach may have the problem that it takes a long time to reach the threshold value, when the threshold value is large. Depending on the failure rate of the overall system, the failure counter value of the majority of nodes might be corrupted before the threshold value is reached. In this case an agreement on the failure notification timing cannot be achieved.

A further prior art document is the article "A Tunable Add-On Diagnostic Protocol for Time-Triggered Systems" by Marco Serafini et al. published in the proceedings of the IEEE International conference on dependable systems and networks (DSN), 2007. The article proposes a method that accumulates the information on detected faults using a penalty/reward algorithm to handle transient, faults.

Based on the prior art, it is an object of the present invention to provide an efficient method and apparatus for monitoring a status of nodes of a communication network.

It is a further object to provide a method and apparatus for monitoring a status of nodes of a communication network with improved robustness.

Furthermore, it is an object of the present invention to provide a method and apparatus for monitoring a status of nodes of a communication network with short notification times having an acceptable behaviour with regard to transient faults.

At least one object is accomplished by the independent claims. Preferred embodiments are specified in the dependent claims.

The invention comprises a method for monitoring a status of nodes of a communication network comprising the steps of dividing the communication network into clusters of nodes, determining first node status data at each node of the communication network by diagnosing the own status of the determining node and the status of the other nodes of the communication network, sending first node status data relating to the nodes of the cluster of the determining node from the determining node to the other nodes of the communication network, receiving second node status data relating to the nodes of the cluster of the sending node from the other nodes of the communication network, and determining node status evaluation data for the nodes of the communication network based on the determining first node status data and the second node status data received from the other nodes of the communication network.

Since only the first node status data relating to the nodes of the cluster of the determining node is sent and only the second node status data relating to the nodes of the cluster of the sending node is received, in comparison to the state of the art, less communication bandwidth is needed. Furthermore, the time needed to carry out the method is reduced.

In some embodiments, the method may comprise the steps of
- receiving at a receiving node second node status data from a node of a cluster to which the receiving node does not belong,
- determining at the receiving node first node status data by diagnosing the status of at least one node of said cluster,
- determining whether or not the first node status data is consistent with the second node status data, and
- diagnosing the status of the receiving node as faulty, if it is determined that the first node status data is inconsistent with the second node status data.

Due to the clustering approach, the view that the nodes of a certain cluster have may deviate from the view that a node outside of the cluster has. In a situation in which all nodes of a cluster determine that a certain node of the cluster is working correctly, while the node outside of the cluster determines that the certain node is faulty, the invention assumes that the node outside of the cluster is faulty. This is a simple, yet efficient approach for resolving inconsistencies.

Furthermore, the invention comprises a method for monitoring a status of nodes of a communication network comprising the steps of
- determining first node status data at a first node by diagnosing the own status of the first node and the status of at least one second node,
- sending the first node status data to at least one second node,
- receiving second node status data from at least one second node, and
- determining node status evaluation data at the first node based on the determined first node status data and the received second node status data, wherein the sending and receiving is periodically performed in communication rounds.

In the methods according to the invention, a node may be a first node and a second node at the same time depending on the role it adopts. The first node status data of the first node is received on the second node as second node status data.

The method may further comprise the step of defining a group of nodes to which the first node belongs. The group may comprise all the nodes of the network, the nodes of a cluster, the nodes of a plurality of clusters, a subset of the nodes of a cluster or any other number of nodes.

Based on the determined node status evaluation data, it may be determined that a certain node is faulty. In this case, a first failure counter is initialized for the certain node, the first failure counter is incremented in each communication round in which the node status evaluation data indicate that the certain node is faulty, the first failure counter is sent to the other nodes of the group, and second failure counters for the certain node from the other nodes of the group are received.

According to one aspect of the invention, furthermore the steps of determining a failure counter value that most of the failure counters of the nodes of the group have, and adjusting the first failure counter, if the determined failure counter value is different from the value of the first failure counter, are carried out.

Since it is determined which value most of the failure counters of the nodes of the group have, it becomes possible to adjust the first failure counter, if it is likely that an error occurred on the node having the first failure counter. In this way, the participating nodes of the group establish a common opinion of the currently correct failure counter value. As a consequence, a corruption of the failure counters of the nodes of the group is prevented.

In some embodiments, the method further comprises the step of notifying an application that uses the communication network of a fault of the certain node, if the first failure counter reaches a predetermined threshold value.

This allows notifying an application of a fault in the case that it is sufficiently likely that a relevant fault is present in the network.

Furthermore, the invention comprises a method for monitoring a status of nodes of a communication network comprising the steps of
- determining first node status data at a first node by diagnosing the own status of the first node and the status of at lease one second node,
- sending the first node status data to at least one second node,
- receiving second node status data from at least one second node, and
- determining node status evaluation data at the first node based on the determined first node status data and the received second node status data, wherein the sending and receiving is periodically performed in communication rounds. Since multiple nodes are determining node status data, a node A may be a second node for a node B, while node B is a second node for node A.

Based on the node status evaluation data, it may be determined that a certain node is faulty. According to one aspect of the invention, when the certain node is detected as faulty after a predetermined number of communication rounds in which the certain node was working correctly, an outage counter is initialized, which is incremented in each communication round after the initialization of the outage counter.

The method may further comprise the step of notifying an application that uses said communication network of a fault of the certain node, if the outage counter reaches a predetermined threshold value. Through the use of the outage counter, a quick notification of the application may be achieved.

In a preferred embodiment, the method may further comprise the step of resetting the outage counter, when it is detected that the certain node was working correctly in a predetermined number of previous communication rounds.

In this way, the outage counter is reset in the case that it is sufficiently likely that the outage counter was initialized due to a transient fault. As a consequence, it is achieved that the application is not notified of transient faults with a high likelihood.

In the above described methods according to the invention, the nodes may be in-vehicle devices of a vehicle control system. In some embodiments of the methods according to the invention, the status of a node is either correct or faulty.

The invention furthermore comprises an apparatus for monitoring a status of nodes of a communication network comprising
- means for dividing the communication network into clusters of nodes,
- means for determining first node status data at each node of the communication network by diagnosing the own status of the determining node and the status of the other nodes of the communication network,
- means for sending first node status data relating to the nodes of the cluster of the determining node from the determining node to the other nodes of the communication network,
- means for receiving second node status data relating to the nodes of the cluster of the sending node from the other nodes of the communication network, and
- means for determining node status evaluation data for the nodes of the communication network based on the determined first node status data and the second node status data received from the other nodes of the communication network.

This apparatus may have the same advantages as the corresponding method according to the invention.

In some embodiments, the apparatus further comprises means for receiving at a receiving node second node status data from a node of a cluster to which the receiving node does not belong, means for determining at the receiving node first node status data by diagnosing the status of at least one node of said cluster, means for determining whether or not the first node status data is consistent with the second node status data, and means for diagnosing the status of the receiving node as faulty, if it is determined that the first node status data is inconsistent with the second node status data.

With these means, inconsistencies can be easily resolved.

Moreover, the invention comprises an apparatus for monitoring a status of nodes of a communication network comprising means for determining first node status data at a first node by diagnosing the own status of the first node and the status of at least one second node, means for sending the first node status data to at least one second node, means for receiving second node status data from at least one second node, and means for determining node status evaluation data at the first node based on the determined first node status data and the received second node status data, wherein the sending and receiving is periodically performed in communication rounds.

The apparatus may furthermore comprise means for defining a group of nodes to which the first node belongs.

In addition, the apparatus may comprise means for determining that a certain node is faulty based on the determined node status evaluation data, means for initializing a first failure counter for the certain node, means for incrementing the first failure counter in each communication round in which the node status evaluation data indicate that the certain node is faulty, means for sending the first failure counter to the other nodes of the group, and means for receiving second failure counters for the certain node from the other nodes of the group.

According to one aspect of the invention, the apparatus furthermore comprises means for determining a failure counter value that most of the failure counters of the nodes of the group have, and means for adjusting the first failure counter, if the determined failure counter value is different from the value of the first failure counter.

With this apparatus, it becomes possible to prevent the failure counters of the nodes from becoming corrupt.

The apparatus may furthermore comprise means for notifying an application that uses said communication network of a fault of the certain node, if the first failure counter reaches a predetermined threshold value.

In addition, the invention comprises an apparatus for monitoring a status of nodes of a communication network comprising means for determining first node status data at a first node by diagnosing the own status of the first node and the status of at least one second node, means for sending the first node status data to at least one second node, means for receiving second node status data from at least one second node, and means for determining node status evaluation data at the first node based on the determined first node status data and the received second node status data, wherein the sending and receiving is periodically performed in communication rounds.

Furthermore, the apparatus may comprise means for determining that a certain node is faulty based on the node status evaluation data, means for initializing an outage counter when the certain node is detected as faulty after a predetermined number of communication rounds in which the certain node was working correctly, and means for incrementing the outage counter in each communication round after the initialization of the outage counter.

In addition, the apparatus may comprise means for notifying an application that uses said communication network of a fault of the certain node, if the outage counter reaches a predetermined threshold value.

In a preferred embodiment, the apparatus may comprise means for resetting the outage counter, when it is detected that the certain node was working correctly in a predetermined number of previous communication rounds.

Based on the outage counter, a quick notification of the application without reporting too many transient faults to the application may be accomplished.

In some embodiments of the apparatus according to the invention, the nodes may be in-vehicle devices of a vehicle control system. In some embodiments, the status of a node may be either correct or faulty.

The method according to the invention as well as the apparatus according to the invention may be implemented by a computer program. Therefore, the invention also comprises a computer program product, the computer program product comprising a computer-readable medium and a computer program recorded therein in the form of a series of state elements corresponding to instructions which are adapted to be processed by a data processing means of a data processing apparatus, such that a method according to the invention is carried out or and apparatus according to the invention is formed on the data processing means.

Further embodiments and details of the present invention will be explained in the following with reference to the figures.

FIG. 2 shows nodes of a communication network according to the prior art.

FIG. 3 shows some aspects of the nodes of a communication network according to the prior art.

FIG. 11 shows one embodiment of a structure of data that is exchanged between nodes according to one aspect of the invention.

FIG. 14 illustrates the behaviour of an outage counter according to one aspect of the invention in comparison to a failure counter.

Figure 6:
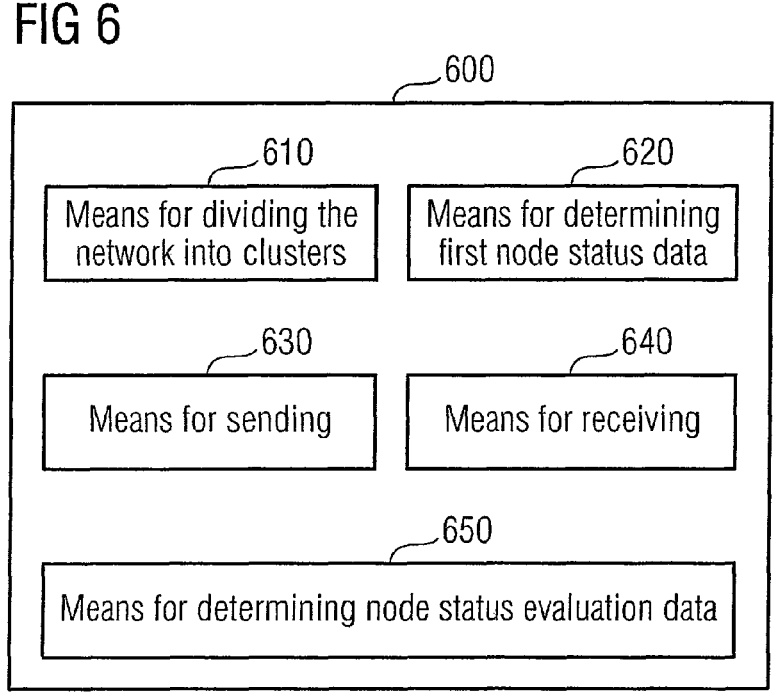
FIG. 6 illustrates one embodiment of the apparatus for monitoring a status of nodes of a communication network according to one aspect of the present invention.
Figure 7:
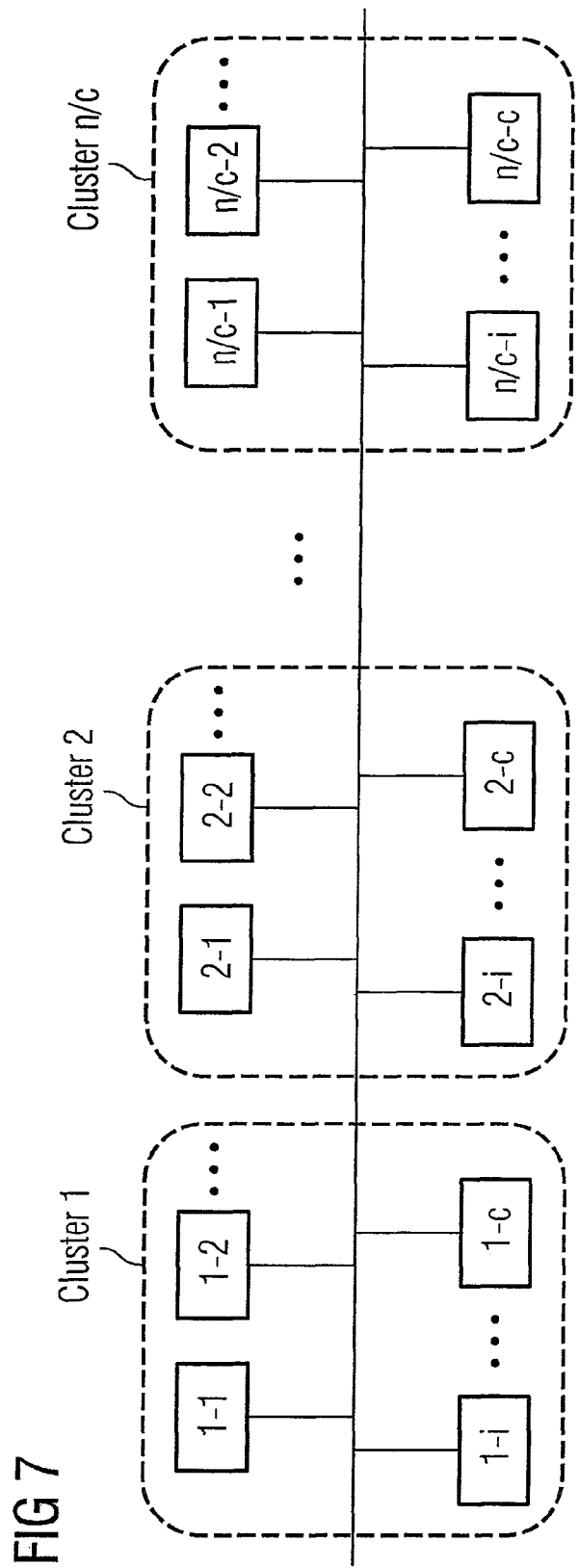
FIG. 7 shows the communication network divided into clusters according to one aspect of the invention.

In the following, one embodiment of the apparatus and the method for monitoring a status of nodes of a communication network according to one aspect of the present invention will be explained with reference to FIGS. 6 to 8. The apparatus for monitoring a status of nodes of a communication network 600 according to the embodiment comprises means for dividing the communication network into clusters of nodes 610 that divide the network into clusters. FIG. 7 shows an example of the clusters. The first node of cluster 1 is denoted 1-1, the second node of cluster 1 is denoted 1-2, and so forth. As can be seen in FIG. 7, n nodes have been logically divided into n/c clusters, wherein each cluster consists of c nodes. Although in the shown example it is assumed that n is dividable by c, the following discussion is also applicable to a system having n nodes not dividable by c.

Means for determining first node status data at each node of the communication network by diagnosing the own status of the determining node and the status of the other nodes of the communication network 620 determine first node status data at each node of the communication network by diagnosing the own status of the determining node and the status of the other nodes of the communication network.

Afterwards, the means for sending first node status data relating to the nodes of the cluster of the determining node from the determining node to the other nodes of the communication network 630 sends first node status data relating to the nodes of the cluster of the determining node from the determining node to the other nodes of the communication network, where the first node status data is received as second node status data.

Furthermore, the means for receiving second node status data relating to the nodes of the cluster of the sending node from the other nodes of the communication network 640 receive second node status data relating to the nodes of the cluster of the sending node from the other nodes of the communication network. Based on the determined first node status data and the second node status data received from the other nodes of the communication network, the means for determining node status evaluation data 650 determines node status evaluation data for the nodes of the communication network.

Figure 8:
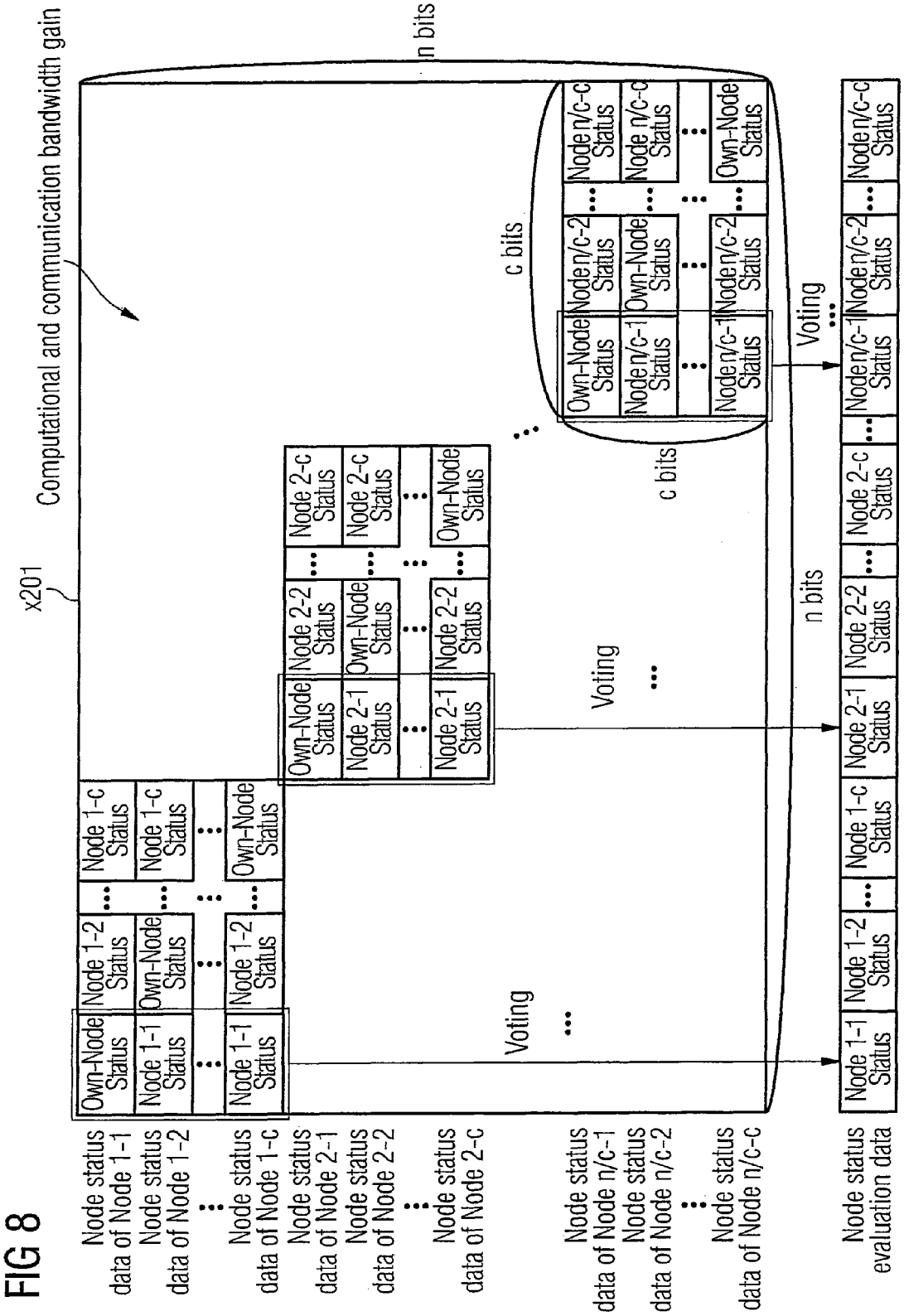
FIG. 8 illustrates the node status data that each node stores in its status evaluation result storage section according to one aspect of the present invention.

FIG. 8 illustrates the node status data that each node stores in its status evaluation result storage section x201 shown, for example, in FIG. 3. As can be easily seen from FIG. 8, every node stores c×c node status data items for each cluster, and since there are n/c clusters in the system, the status evaluation result storage and communication bandwidth can be reduced to only n×c bits, which also reduces the execution time of the voting process by c/n.

Figure 1:
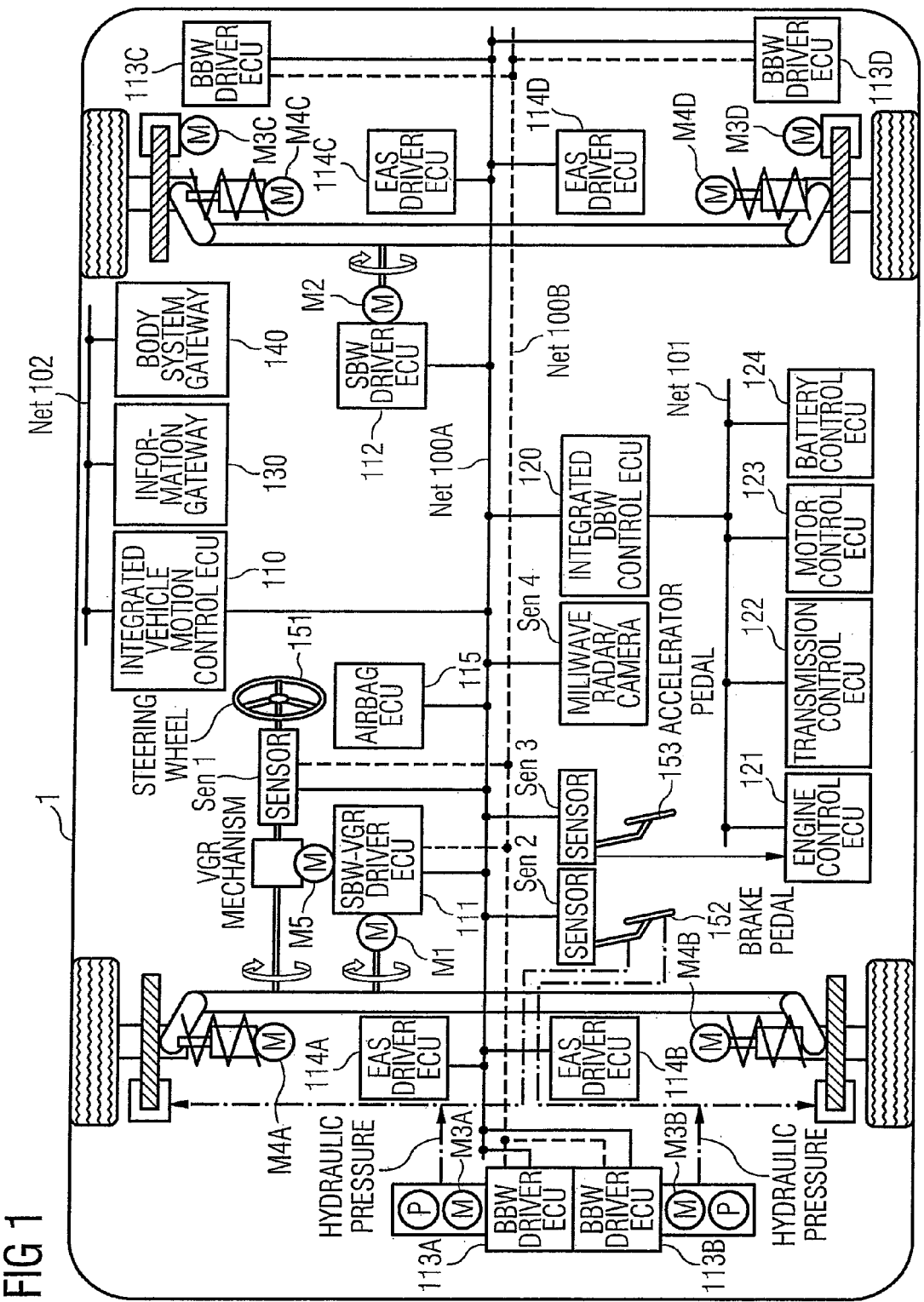
FIG. 1 shows a system block diagram of a vehicle control system.
Figure 4:
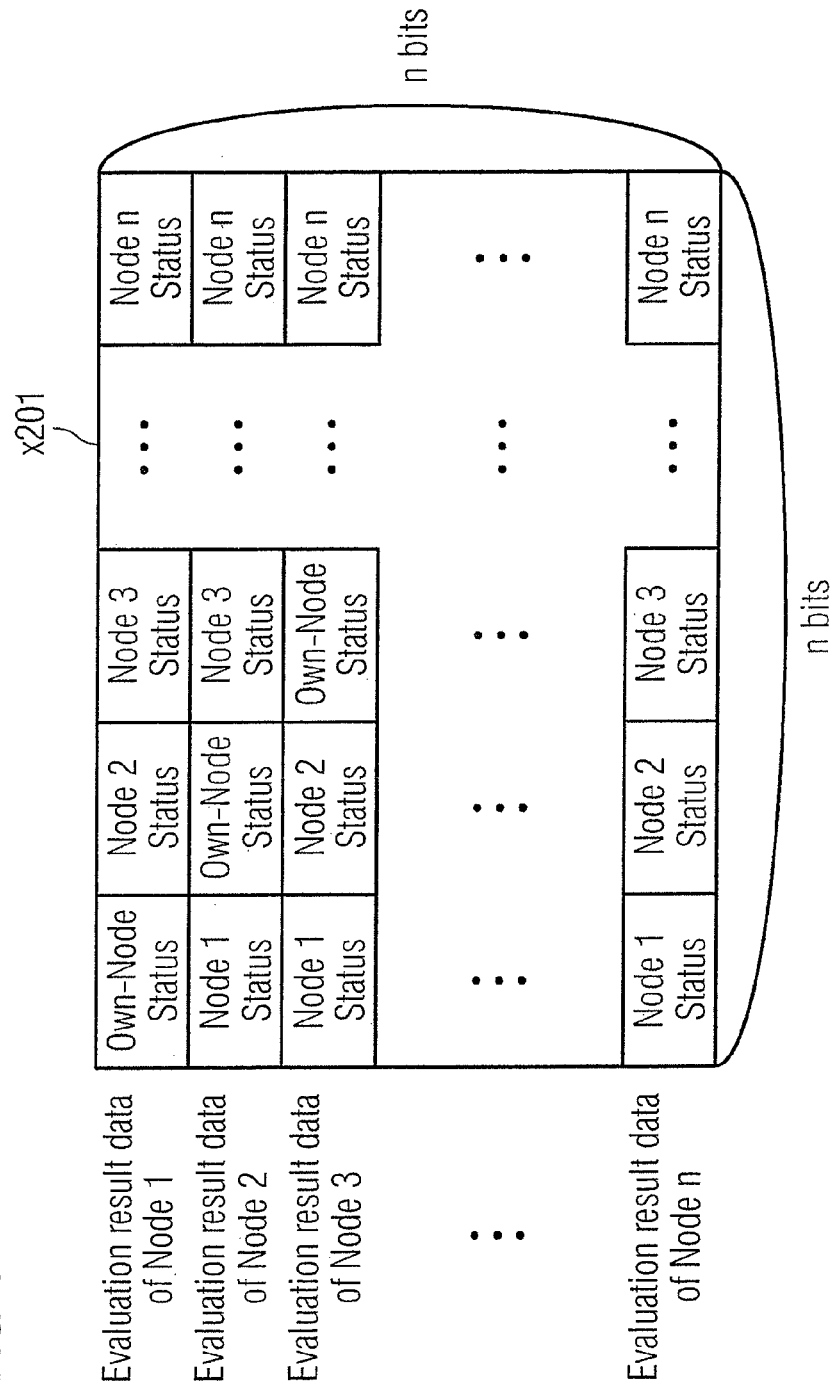
FIG. 4 illustrates the amount of evaluation result data that is stored in the status evaluation result storage section in the nodes of a communication network according to the prior art.
Figure 5:
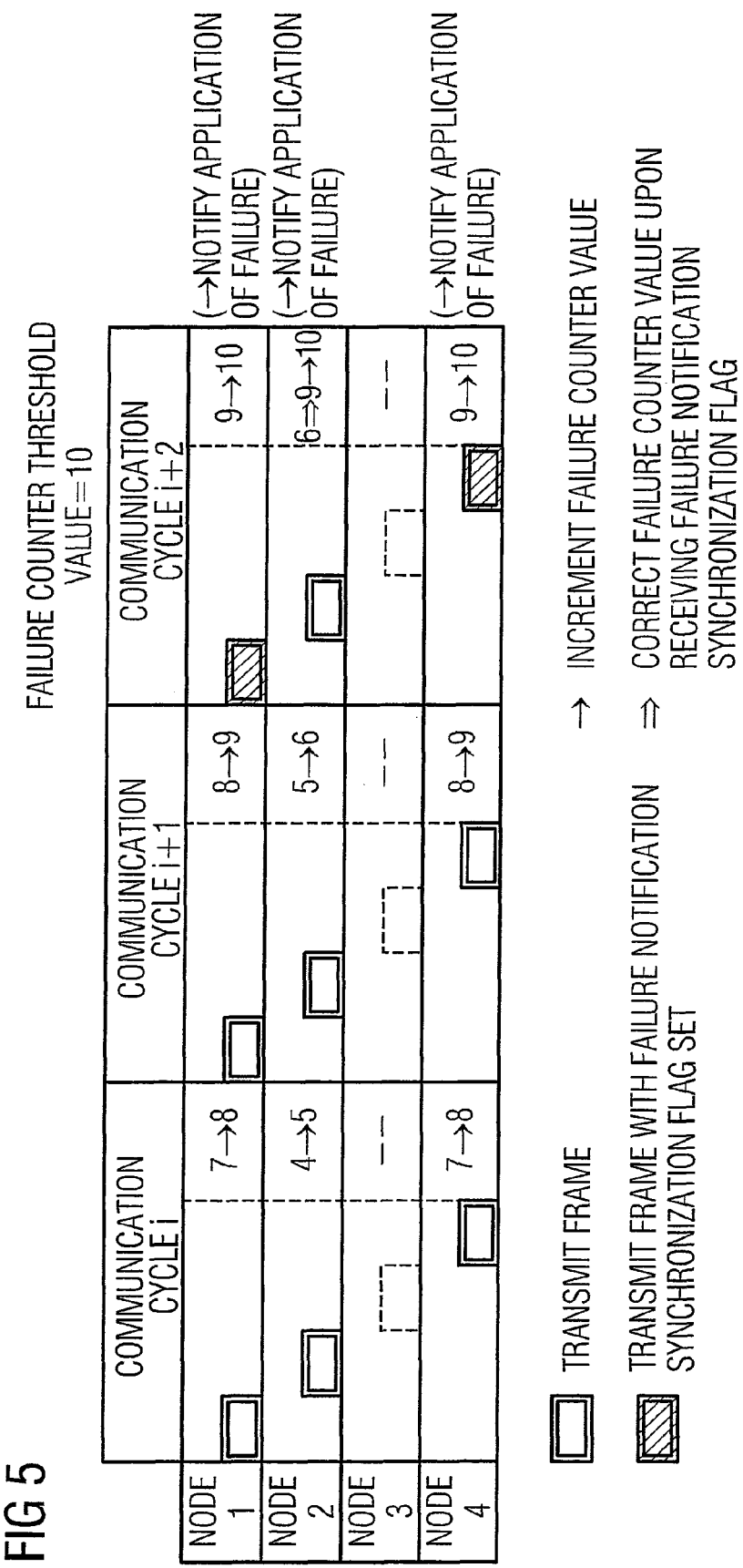
FIG. 5 illustrates an approach of the prior art for synchronizing the nodes of a communication network.

The vacant areas shown in FIG. 8 illustrate the gain of computational effort and communication bandwidth in comparison to FIG. 4. Only n×c bits of memory need to be allocated rather than n×n bits in the prior art.

As illustrated in FIG. 8, based on the node status data for a node a voting process determines node status evaluation data for the node.

Figure 9:
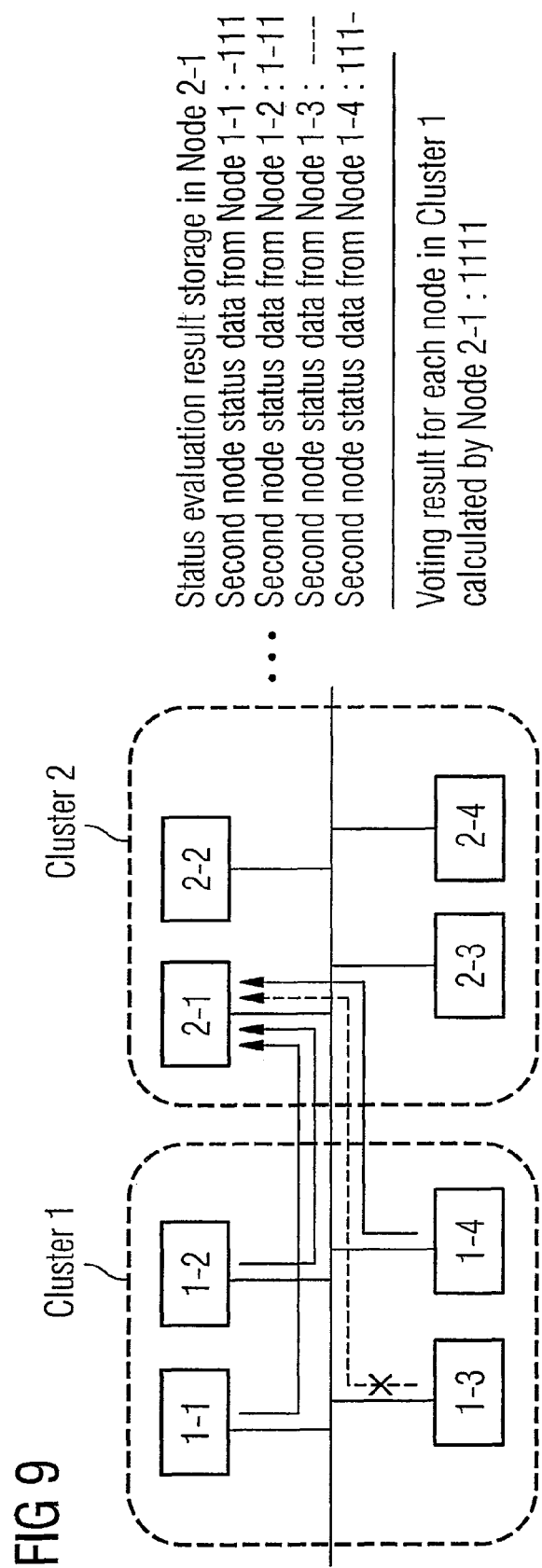
FIG. 9 illustrates an embodiment of the method for monitoring a status of nodes of a communication network according to an aspect of the present invention.

FIG. 9 illustrates an embodiment of the method for monitoring a status of nodes of a communication network according to an aspect of the invention. As shown in FIG. 9, node 2-1 receives second node status data from the nodes 1-1, 1-2, and 1-4 of cluster 1, a cluster to which node 2-1 does not belong. Node 2-1 does not receive any second node status data from node 1-3 and therefore determines that either itself or node 1-3 is faulty. In other words, node 2-1 determines first node status data by diagnosing the status of node 1-3. This first node status data indicate that either node 1-3 or node 2-1 is faulty.

Node 2-1 evaluates the second node status data received from the nodes 1-1, 1-2, and 1-4 as shown on the right side of FIG. 9. "1" represents that the node is correct, "0" denotes that the node is faulty, and "–" denotes that no information has been received. As can be seen on the right side of FIG. 9, node 1-1 informs node 2-1 that according to the view of node 1-1, the nodes 1-2, 1-3, and 1-4 are working correctly because the first bit of the second node status data contains information about the node 1-1, the second bit contains information about the node 1-2, the third bit contains information about the node 1-3, and the forth bit contains information about the node 1-4.

The node 2-1 evaluates the second node status data and determines that according to the view of the nodes of the cluster, every node in the cluster is working correctly. However, node 2-1 has not received information from node 1-3, which means that either node 1-3 or node 2-1 is faulty. Since node 2-1 derived from the second node status data that all the nodes of the cluster 1 are working correctly, node 2-1 can conclude that itself must be faulty. In other words, node 2-1 determines that the first node status data is inconsistent with the second node status data and therefore diagnoses the status of itself as faulty.

Figure 10:
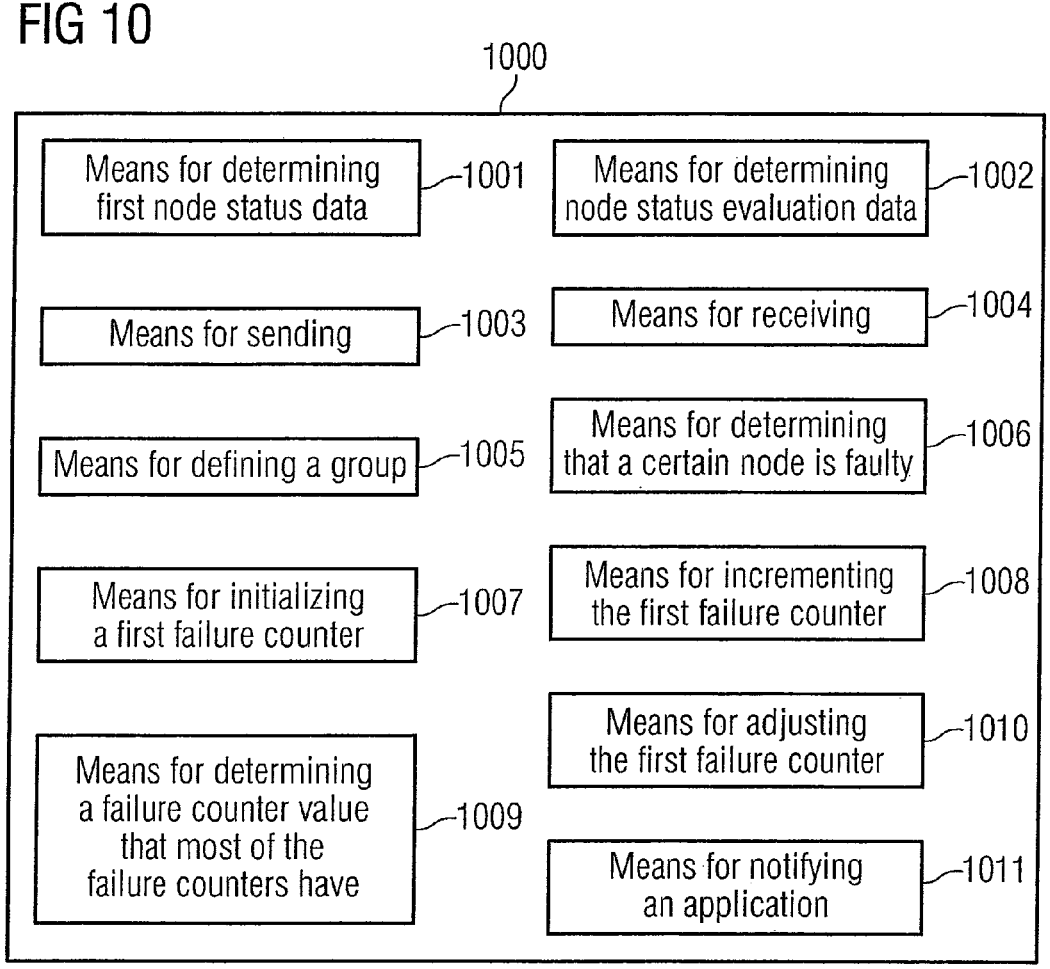
FIG. 10 shows an embodiment of the apparatus for monitoring a status of nodes of a communication network according to one aspect of the present invention.
Figure 12:
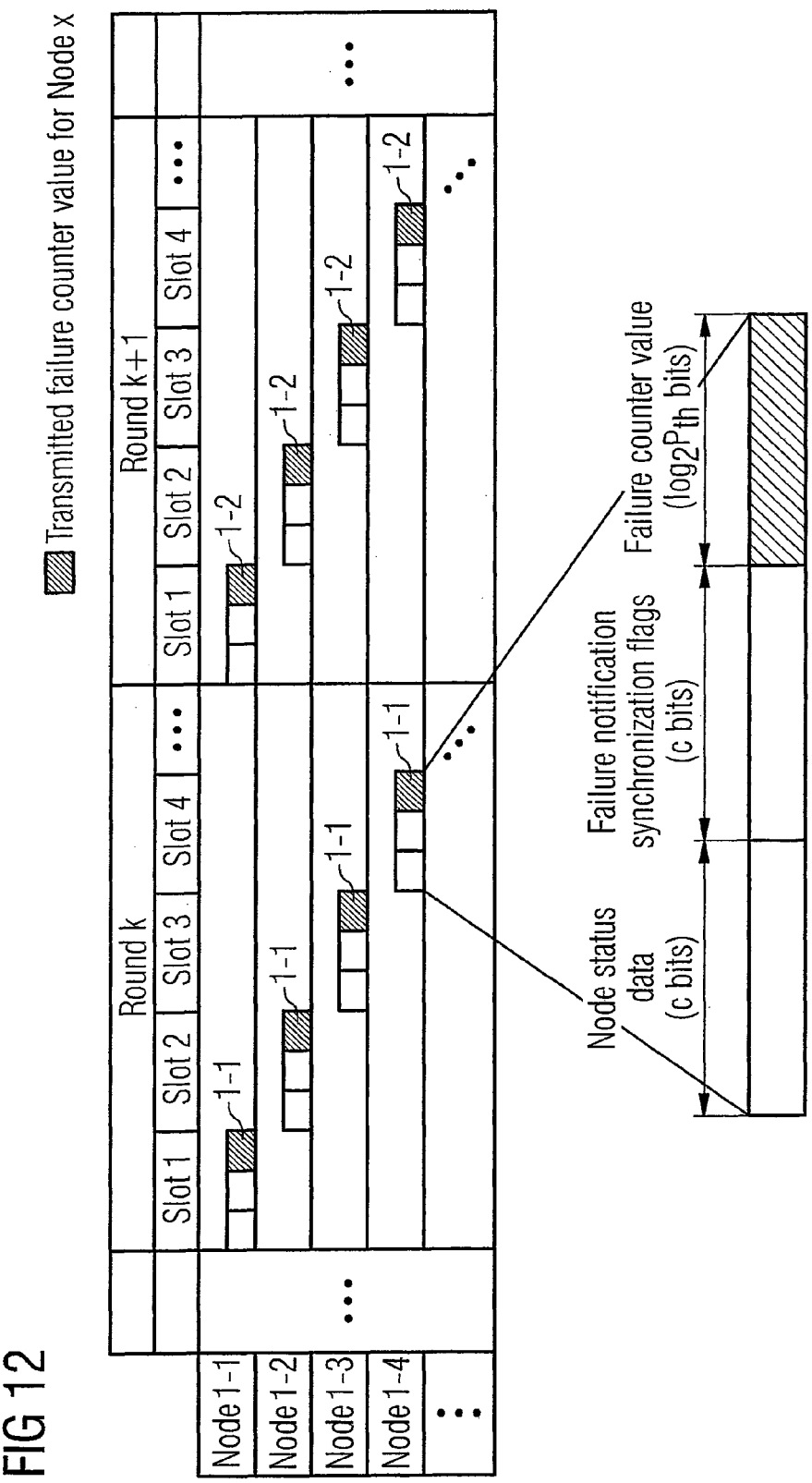
FIG. 12 illustrates the exchange of data between the nodes according to one aspect of the invention.

In the following, an embodiment of the apparatus and the method for monitoring a status of nodes of a communication network according to one aspect of the present invention will be explained with reference to FIGS. 10 to 12. The shown embodiment of the apparatus 1000 comprises means for determining first node status data at a first node by diagnosing the own status of the first node and the status of at least one second node 1001 that determine first node status data by diagnosing the own status of the first node and the status of at least one second node. Means for sending 1003 send the first node status data to at least one second node. Second node status data from at least one second node is received by the means for receiving 1004.

The apparatus 1000 furthermore comprises means for determining node status evaluation data at the first node based on the determined first node status data and the received second node status data 1002 that determine node status evaluation data based on the determined first node status data and the received second node status data. The sending and receiving is periodically performed in communication rounds. A group of nodes to which the first node belongs is defined by means for defining a group of nodes to which the first node belongs 1005.

The apparatus 1000 furthermore comprises means for determining that a certain node is faulty based on the determined node status evaluation data 1006. When these means determine that a certain node is faulty, the first failure counter for the certain node is initialized to 1 by the means for initializing a first failure counter for the certain node 1007 that is a part of the apparatus 1000. The first failure counter is incremented in each communication round in which the node status evaluation data indicate that the certain node is faulty by means for incrementing the first failure counter 1008. The first failure counter is sent to the other nodes of the group by the means for sending 1003 and the means for receiving 1004 receive second failure counters for the certain node from the other nodes of the group.

The apparatus 1000 furthermore comprises means for determining a failure counter value that most of the failure counters of the nodes of the group have 1009 that determine a failure counter value that most of the failure counters of the nodes of the group have. The means for adjusting the first failure counter 1010 adjust the first failure counter if the determined failure counter value is different from the value of the first failure counter.

The means for notifying an application 1011 notify an application that uses the communication network of a fault of the certain node, if the first failure counter reaches a predetermined threshold value.

FIG. 11 shows one embodiment of a structure of the data that is sent by the means for sending 1003. The data structure comprises a field for the node status data 1110 that comprises one sub-field for each diagnosed node. Furthermore, a failure notification synchronization flag field 1120 is provided in the shown data structure. Each bit in this failure notification synchronization flag field 1120 indicates whether a certain node is faulty or not, which is determined, for example, by the means 1011. In a failure counter value field 1130, a failure counter value is transmitted.

In this failure counter value field 1130, the failure counter value of a certain node is transmitted based on the communication round. As illustrated in the example of FIG. 12, in round k the failure counter value for node 1-1 is transmitted, whereas in round k+1 the failure counter value for node 1-2 is transmitted. FIG. 12 illustrates the system using a clustering concept according to one aspect of the present invention, such that first failure counter values relating to the nodes of the cluster are sent within the cluster. Nevertheless, the embodiment illustrated in FIGS. 10 to 12 is also applicable to systems without the clustering concept.

Even though more communication bandwidth (namely $\log_2 P_{th}$ bits, where $P_{th}$ is the threshold value of the failure counter value) is required, the failure counter value of nodes that have an incorrect failure counter value (due to, for example, bit inversions, etc.) can be adjusted before the number of nodes with corrupt failure counters increases too much.

In the following, with reference to FIGS. 13 and 14, an embodiment of the apparatus and the method for monitoring a status of nodes of a communication network according to one aspect of the present invention will be explained. The apparatus 1300 shown in FIG. 13 comprises means for determining first node status data 1301 that determines first node status data at a first node by diagnosing the own node status of the first node and the status of at least one second node. The means for sending 1303 sends the first node status data to at least one second node and the means for receiving 1304 receive second node status data from at least one second node. Based on the determined first node status data and the received second node status data, means for determining node status evaluation data 1302 determine node status evaluation data at the first node. The sending and receiving performed by the means for sending 1303 and the means for receiving 1304 is periodically performed in communication rounds.

The apparatus 1300 furthermore comprises means for determining that a certain node is faulty based on the node status evaluation data 1305. When the certain node is detected as faulty after a predetermined number of communication rounds in which the certain node was working correctly, the means for initializing an outage counter 1306 initializes an outage counter. Afterwards, the means for incrementing the outage counter 1307 increments the outage counter in each communication round after the initialization of the outage counter.

Figure 13:
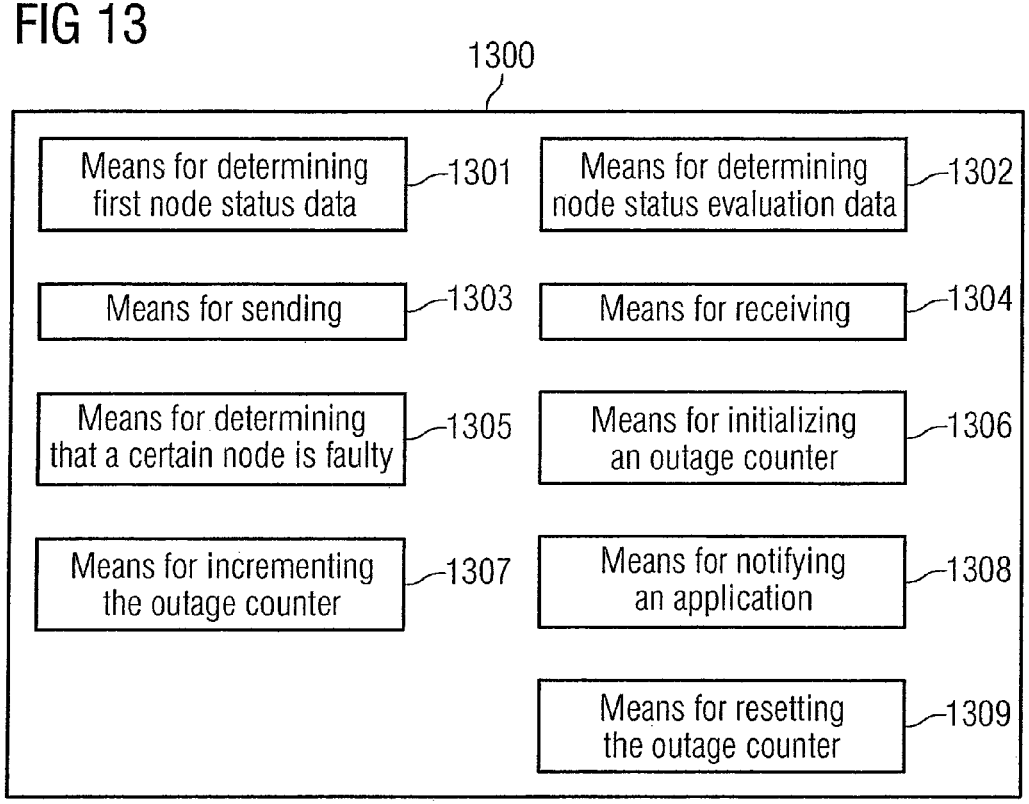
FIG. 13 shows one embodiment of the apparatus for monitoring a status of nodes of a communication network according to one aspect of the present invention.

The apparatus 1300 shown in FIG. 13 furthermore comprises means for notifying an application 1308 that notify an application that uses said communication network of the fault of the certain node, if the outage counter reaches a predetermined threshold value. The means for resetting the outage counter 1309 reset the outage counter to 0, when it is detected that the certain node was working correctly in a predetermined number of previous communication rounds.

FIG. 14 illustrates the behaviour of the outage counter in comparison to the failure counter using three scenarios. The outage counter as well as the failure counter may be handled based on the first and second node status data, not only the first node status data. However, in the following discussion of FIG. 14, for simplicity, a fault of the receiver is not considered, which means that a fault is assumed to be caused by the sending node. In the first line of each scenario (cases 1 to 3), a circle means that a message is correctly received in the communication round, i.e. the sending node is working correctly, while a cross means that the message is not correctly received, i.e. the sending node is faulty. The threshold value is 4 for the outage counter as well as the failure counter and the predetermined number of correct previous communication rounds for the resetting is 3, which means that the outage counter increases until three continuous messages are correctly received, because the application program is assumed to calculate the output result based on the three last received messages. This is often assumed by application programs executing a control logic.

Case 1 illustrates a permanent fault. The permanent fault is present beginning in round 4. In this scenario, the failure counter and the outage counter have the same behaviour, namely the failure counter and the outage counter are incremented by 1 beginning in round 4. In round 7, the counters reach the threshold value of 4 and the application is notified.

Case 2 illustrates what happens when the fault is intermittent, which means that the fault is present in some rounds and vanishing in other rounds without being completely overcome. The first fault occurs in round 4. The outage counter starts being incremented and reaches the threshold value in round 7, such that the application is notified in round 7. By contrast, the failure counter is incremented each time an intermittent fault occurs. Since the intermittent fault occurs in rounds 4, 5, 8 and 11, it lasts until round 11 till the application is notified based on the failure counter. This means that in the case of intermittent faults, potentially the outage counter leads to a faster notification of the application.

Case 3 illustrates a scenario where the intermittent faults occur infrequently, such that the outage counter is reset. The first fault happens in round 3, in which the failure counter and the outage counter are incremented by 1. The outage counter is incremented in each round until round 6 in which the system notices that the node was working correctly in the last three rounds, such that the outage counter is reset to zero. The next fault occurs in round 7, where the failure counter is incremented to 2 and the outage counter is initialized to 1 again and starts counting. The outage counter is incremented and reaches the value 4 in round 10 without being reset again, since until round 10 no period of three rounds in which the node worked correctly occurs. This means that in round 10, the application is notified based on the outage counter. In the same round, the failure counter is still at the value 3. Since the next fault occurs not earlier than in round 18, based on the failure counter, the notification of the application is performed in round 18.

The explanations of the embodiments and the drawings are to be understood in an illustrative rather than in a restrictive sense. It is evident that various modifications and changes may be made thereto without departing from the scope of the invention as set forth in the claims. It is possible to combine the features described in the embodiments in a modified way for providing additional embodiments that are optimized for a certain usage scenario. As far as such modifications are readily apparent for a person skilled in the art, these modifications shall be regarded as disclosed by the above described embodiments.

The invention claimed is:

1. Apparatus for monitoring a status of nodes of a communication network, the apparatus comprising:
   means for determining first node status data at a first node by causing said first node to diagnose its own status and the status of at least one second node;
   means for sending the first node status data to at least one other node;
   means for receiving second node status data from at least one other node, said sending and receiving being performed periodically in communication rounds;
   means for determining node status evaluation data for the first node based on the determined first node status data and the received second node status data;
   means for determining that a certain node is faulty based on the node status evaluation data;
   means for initializing an outage counter, when the certain node is detected as faulty after a predetermined number of communication rounds in which the certain node was working correctly;
   means for incrementing the outage counter in each communication round in which the node remains faulty after the initialization of the outage counter; and
   means for resetting the outage counter when it is detected that the certain node was working correctly in a predetermined number of previous communication rounds.

2. Method for monitoring failure status of nodes of a communication network, the method comprising:
   dividing the communication network into clusters of nodes;
   determining node status data at each node of the communication network by causing each node to diagnose its own status and the status of the other nodes of the communication network;
   sending first node status data relating to the nodes of the cluster of the determining node from the determining node to the other nodes of the communication network;
   each node receiving, from the other nodes of the communication network, second node status data relating to the nodes of the cluster of the sending node; and
   determining node status evaluation data for identifying a particular node or nodes of the communication network, based on the determined first node status data and the second node status data received from the other nodes of the communication network,
   receiving at a receiving node second node status data from nodes of a cluster to which the receiving node does not belong,
   determining at the receiving node first node status data by diagnosing the status of at least one node of the cluster,
   determining whether or not the first node status data is consistent with the node status evaluation data based on the second node status data, and
   diagnosing the status of the receiving node as faulty if it is determined that the first node status data is inconsistent with the node status evaluation data.

3. Method for monitoring a status of nodes of a communication network, the method comprising:
   determining first node status data at a first node by diagnosing the own status of the first node and the status of at least one second node,
   sending the first node status data to at least one second node,
   receiving second node status data from at least one second node,
   determining node status evaluation data at the first node based on the determined first node status data and the received second node status data,
   wherein the sending and receiving is periodically performed in communication rounds,
   determining that a certain node is faulty based on the determined node status evaluation data,
   initializing a first failure counter for the certain node,
   incrementing the first failure counter in each communication round in which the node status evaluation data indicate that the certain node is faulty,
   sending the first failure counter to the other nodes,
   receiving second failure counters for the certain node from the other nodes,
   determining a failure counter value that most of the failure counters of the nodes have, and
   adjusting the first failure counter if the determined failure counter value is different from the value of the first failure counter.

4. Method according to claim 3, further comprising notifying an application that uses the communication network of a fault of the certain node if the first failure counter reaches a predetermined threshold value.

5. Apparatus for monitoring a status of nodes of a communication network, the apparatus comprising
   means for determining first node status data at a first node by diagnosing the own status of the first node and the status of at least one second node,
   means for sending the first node status data to at least one second node,
   means for receiving second node status data from at least one second node,
   means for determining node status evaluation data at the first node based on the determined first node status data and the received second node status data,
   wherein the sending and receiving is periodically performed in communication rounds,
   means for determining that a certain node is faulty based on the determined node status evaluation data,
   means for initializing a first failure counter for the certain node,
   means for incrementing the first failure counter in each communication round in which the node status evaluation data indicate that the certain node is faulty,
   means for sending the first failure counter to the other nodes,
   means for receiving second failure counters for the certain node from the other nodes,
   means for determining a failure counter value that most of the failure counters of the nodes have, and
   means for adjusting the first failure counter if the determined failure counter value is different from the value of the first failure counter.

6. Apparatus to claim 5, further comprising means for notifying an application that uses the communication network of a fault of the certain node if the first failure counter reaches a predetermined threshold value.

7. Method for monitoring a status of nodes of a communication network, the method comprising:
- determining first node status data at a first node by causing said first node to diagnose its own status and the status of at least one second node;
- sending the first node status data to at least one other node;
- receiving second node status data from at least one other node, said sending and receiving being performed periodically in communication rounds;
- determining node status evaluation data for the first node based on the determined first node status data and the received second node status data;
- determining that a certain node is faulty based on the node status evaluation data;
- initializing an outage counter, when the certain node is detected as faulty after a predetermined number of communication rounds in which the certain node was working correctly;
- incrementing the outage counter in each communication round in which the certain node remains faulty after the initialization of the outage counter; and
- resetting the outage counter when it is detected that the certain node was working correctly in a predetermined number of previous communication rounds.

8. Apparatus for monitoring failure status of nodes of a communication network, the apparatus comprising:
- means for dividing the communication network into clusters of nodes;
- means for determining node status data at each node of the communication network by causing each node to diagnose its own status and the status of the other nodes of the communication network;
- means for sending first node status data relating to the nodes of a cluster of the determining node from the determining node to the other nodes of the communication network;
- means for receiving, from the other nodes of the communication network, second node status data relating to the nodes of the cluster of the sending node;
- means for determining node status evaluation data for identifying a particular node or nodes of the communication network, based on the determined first node status data and the second node status data received from the other nodes of the communication network;
- means for receiving at a receiving node second node status data from nodes of a cluster to which the receiving node does not belong,
- means for determining at the receiving node first node status data by diagnosing the status of at least one node of the cluster,
- means for determining whether or not the first node status data is consistent with the node status evaluation data based on the second node status data, and
- means for diagnosing the status of the receiving node as faulty if it is determined that the first node status data is inconsistent with the node status evaluation data.

* * * * *